Aug. 15, 1933.                T. A. JENKINS                1,922,541
             CIRCULATING DISPLAY ADVERTISING APPARATUS
                      Filed Jan. 13, 1933        6 Sheets-Sheet 2

Fig. 3

INVENTOR.
Thomas A. Jenkins

Aug. 15, 1933.  T. A. JENKINS  1,922,541
CIRCULATING DISPLAY ADVERTISING APPARATUS
Filed Jan. 13, 1933   6 Sheets-Sheet 4

INVENTOR.

Patented Aug. 15, 1933

1,922,541

UNITED STATES PATENT OFFICE 1,922,541

CIRCULATING DISPLAY ADVERTISING APPARATUS

Thomas Alfred Jenkins, Roselle Borough, N. J.

Application January 13, 1933. Serial No. 651,551

19 Claims. (Cl. 40—32)

My invention relates to improvements in circulating display advertising apparatus and consists of the construction; combinations and arrangements herein described and claimed.

The general object of my invention is the provision, in a manner as hereinafter set forth, of a circulating display advertising apparatus of unique design; attractive, durable; efficient and inexpensive in operating maintenance.

The fundamental object of this invention is the utilization of an inexpensive and attractive means of displaying circulating advertising cards of various products, in locations where respective products are used.

A further object of this invention is in the accomplishment, of a compact and completely secured mechanism, within a cabinet, resulting in a machine that is free from loose or rattling mechanical elements, which in effect renders the machine useful on moving structures, such as railway cars; steamships, etc., thus making the scope of utilization, very large.

The invention will be best understood from a consideration of the following detailed description, taken in connection with the accompanying drawings, forming a part of this specification, with the understanding that the invention is not confined to any strict conformity with the showing of the drawings, but may be changed and modified so long as such changes and modifications make no material departure from the salient features of the invention, as expressed in the appended claims.

In the drawings:—

Referring now, to the drawings in detail, like numerals of reference indicate corresponding parts throughout the several views.

The apparatus in general is an attractive cabinet, unique in design, having an inwardly converging aperture in the face of door, with an arrangement of illumination highly effective, the said apparatus being adaptable for mounting on walls; recessing in panels or partitions, or placing on stands; store counters or the like, with the object of presenting a circulating display of advertising matter.

Figure 2:
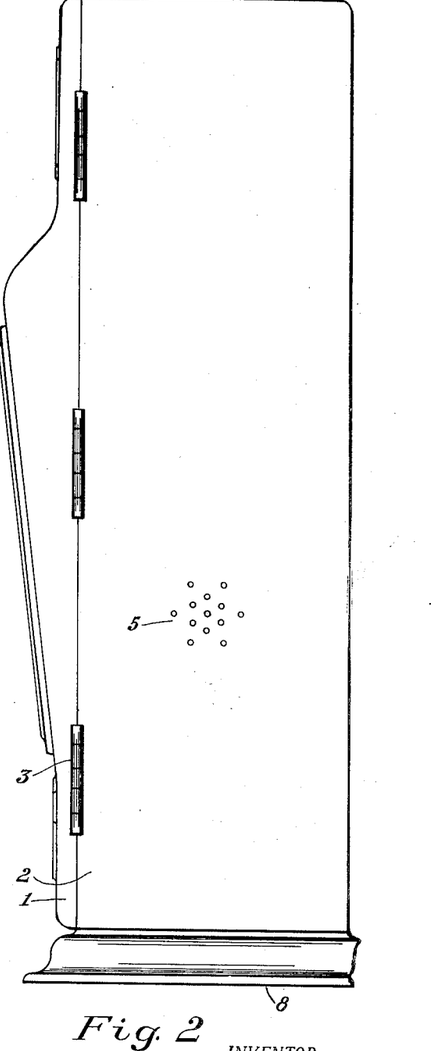
Figure 2 is a side elevation of said apparatus.

In Fig. 2, numeral 1 is a door, 2 is the body and 8 is a base. Numeral 3 shows one of a number of hinges, upon which the door 1 is carried. At numeral 5 is shown a series of holes which serve as a means of ventilation.

Figure 1:
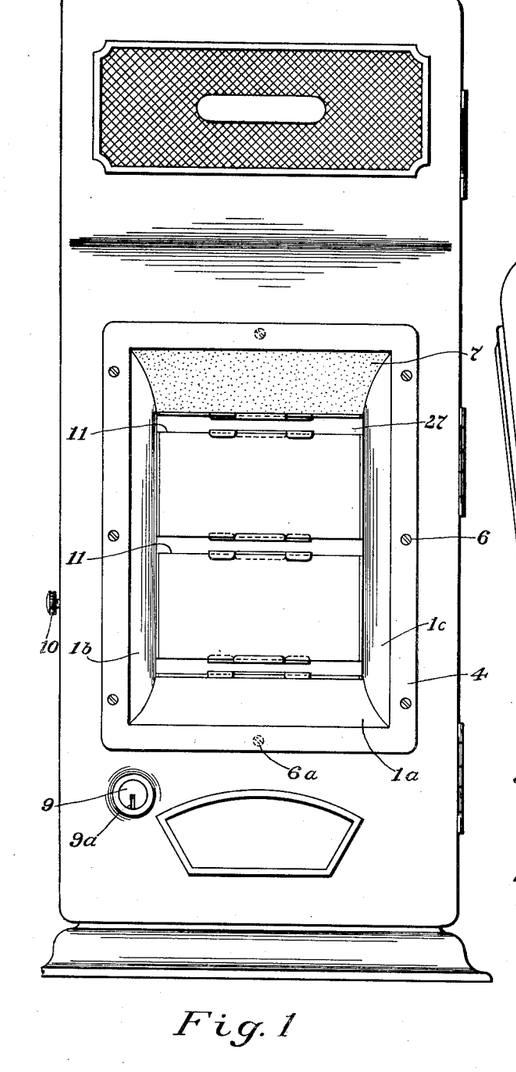
Figure 1 is a front elevation of the circulating display advertising apparatus.

In Fig. 1, numeral 4 is a frame that retains a transparent vitreous panel. Numeral 6 is one of a number of screws used to fasten frame 4 to door 1. At 6a is shown a screw entered from the interior side of door 1. The purpose of this is to prevent the removal of frame 4 and transparent vitreous panel 59, shown in Fig. 4, while the cabinet is in locked position. At 7 is shown a plate of vitreous material, which is treated to accomplish the function of diffusing and directing illuminating rays. The side walls, 1b and 1c of the inwardly converging aperture of door, is of a convexed contour and the upper and lower walls have a direct taper as at 1a and 7 shown more clearly in Figs. 4 and 6. However, the convexed contour has no effect, other than a possible neater appearance. Numeral 11 shows one of a number of duplex card retaining plates. When the machine is in operation, the duplex card retaining plates 11, move in an upward direction and the movement is gradual and constant. Said plates 11 are arranged to hold two cards, one in the front and one in the rear or in other words one on each side. As the plates 11 pass a certain location in the rear of the cabinet or mechanism, each one is caused mechanically to make one-half revolution, thus bringing into position a second card, which will be displayed in sequence, as it passes the converged aperture in door 1. A detailed description of said movement will follow later on in this specification. While the plates 11, which in actual operation will have advertising cards fastened thereto, are in motion, incandescent elements 22 shown in Fig. 3, which are mounted above vitreous plate 7, will cast a well diffused volume of illuminating rays, which will attract attention to the advertising matter on cards displayed. Numeral 10 indicates a control button which forms a component part of a lock bolt. Numeral 9 is a lock cylinder and 9a is the keyhole of same. To lock the cabinet, control button 10 must be moved upward a distance and a key inserted in keyhole 9a and turned in proper direction, after which said key can be removed. The cabinet is then locked. To unlock the cabinet, reversed operations are necessary. The control button 10 can be arranged, so that a downward movement of same would be used for locking, instead of upward, this of course would be a matter of choice.

Figure 3:
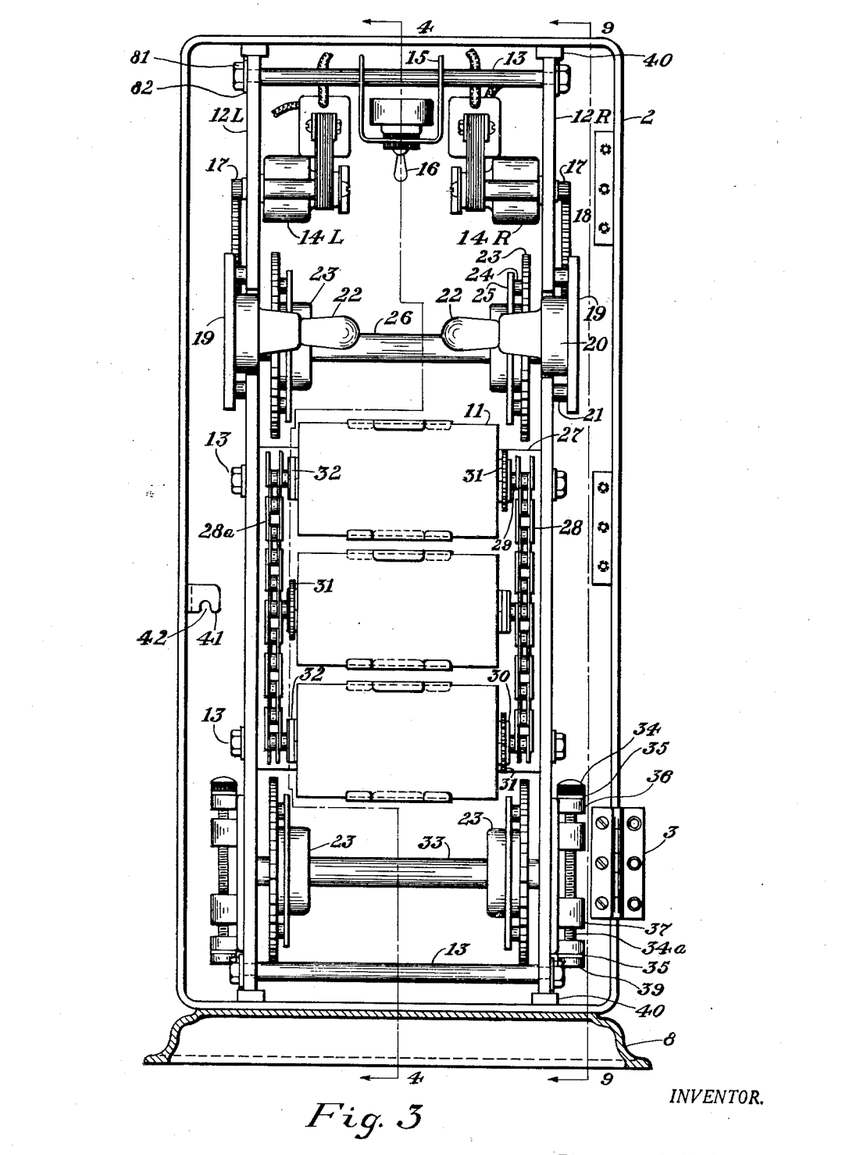
Figure 3 is a front elevation of said apparatus with door removed.
Figure 11:
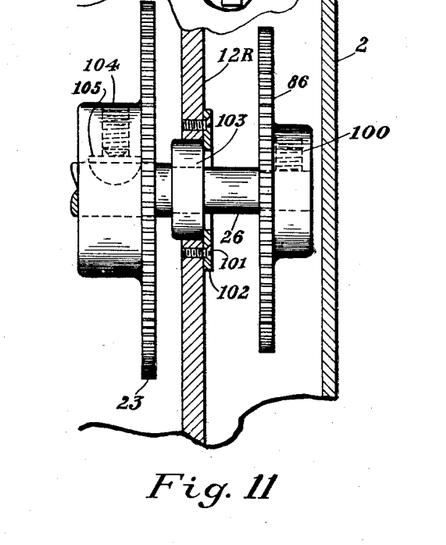
Figure 11 is an enlarged fragmentary section taken along line 11—11 of Fig. 9. In this view, the gear that meshes with same is omitted for clearness.

In Fig. 3 is shown in general, body of cabinet 2 and a sectional view through the base 8. Supporting blocks are indicated by numeral 40. Two are shown at the top and two at the bottom. Said blocks 40 are fastened to the body 2 by means of screws or the like. Side frame plates 12R and 12L are supported between the bars 40. Plates 12R and 12L when completely assembled, carry the entire mechanism and as a whole is secured in place in the cabinet, by means of cleats 83 shown in Fig. 9. The cleats 83 slip into indentures 122 in blocks 40 shown in Figs. 6 and 9. The cleats 83 are fastened to the sides of plates 12R and 12L by means of screws 84. The plates 12R and 12L are maintained in spaced relation by means of spacing rods 13. Two of such rods 13 are shown at the top; two at the bottom and two between the top and bottom. The spacing rods 13 have a shoulder at each end. Said shoulders fit into corresponding holes in plates 12R and 12L. On the ends of said spacing rods 13 a second shoulder is formed, which is threaded, this threaded shoulder passes through a lock washer 82 and is then secured in place by means of a threaded nut 81. At the upper part of Fig. 3 is shown a shaft 26 and at the lower part is shown a shaft 33 which is somewhat similar. Mounted on shafts 26 and 33 are sprocket gears 23. Said gears are secured in position by the use of keys 105 and set screws 104 of Fig. 11. Shaft 26 is supported at each end by a ball bearing 103 Fig. 11. Ball bearings 103 are pressed in corresponding holes in plates 12R and 12L as shown in Fig. 11. In Fig. 11 is also shown a ball bearing retaining ring 102 which is fastened by a number of screws as 101, Fig. 11. A spur gear 86 is mounted on each end of shaft 26 as shown in Fig. 11. Same is secured in place by means of a set screw 100.

Figure 9:
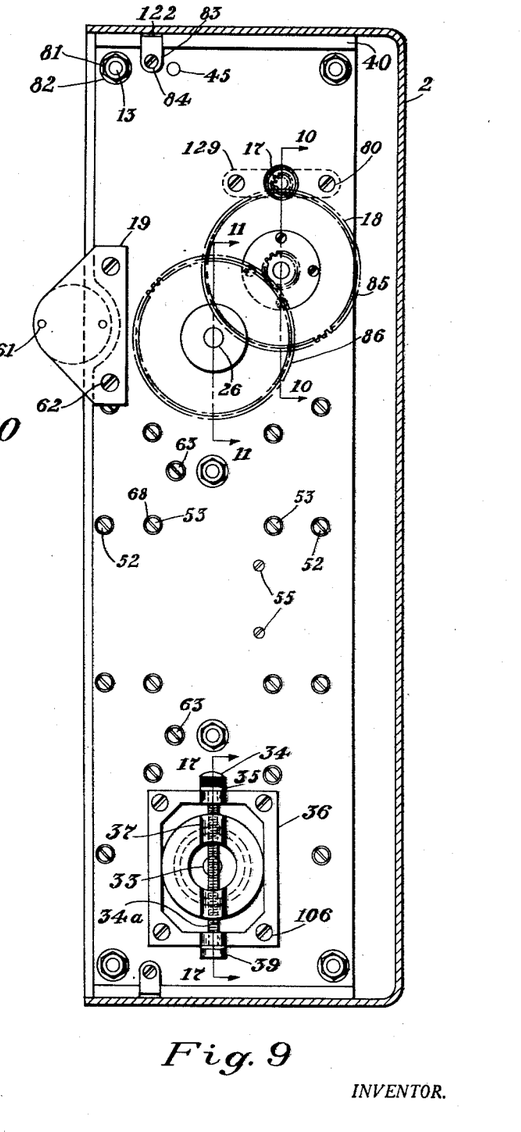
Figure 9 is a view taken along line 9—9 of Fig. 3, with base and door removed.
Figures 12, 13, 14, 15, 16, 17:
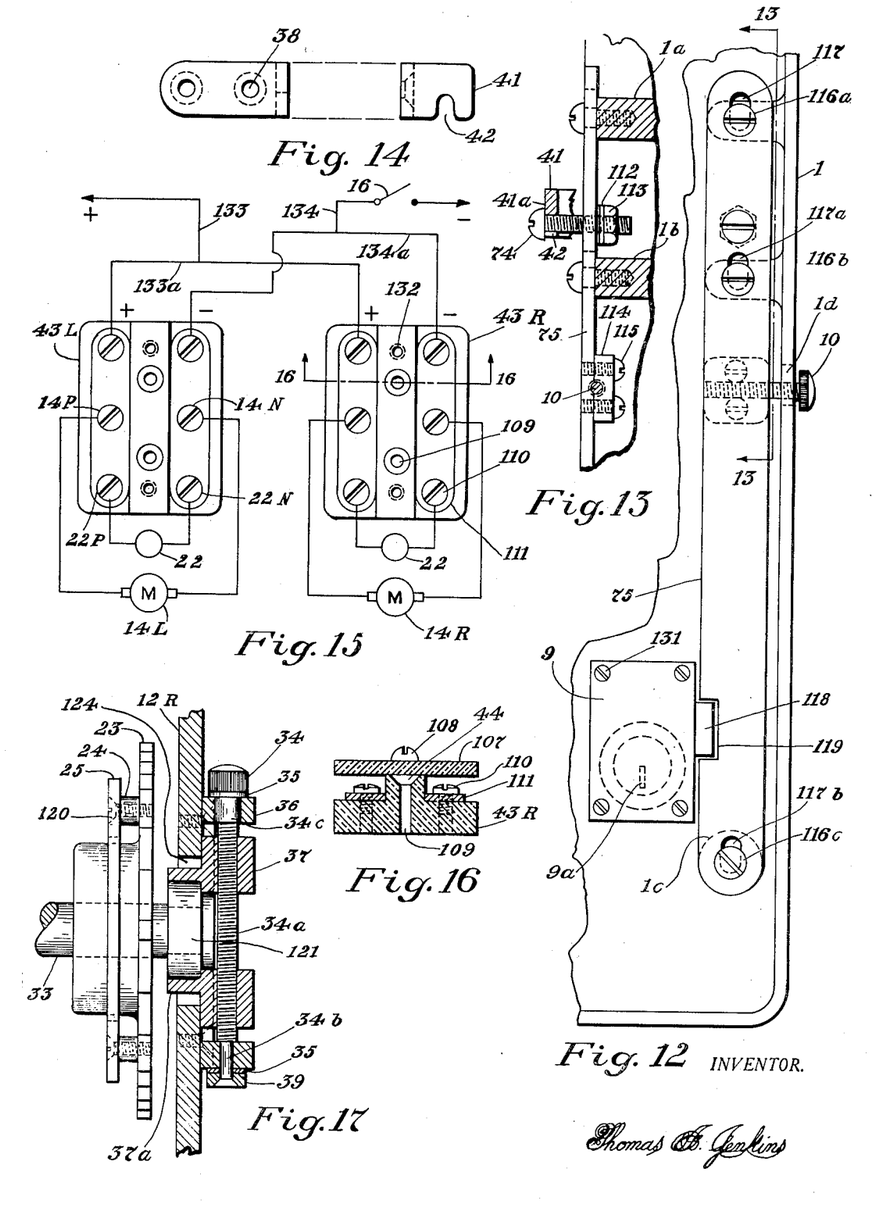
Figure 12 is an enlarged fragmentary view taken along line 12—12 of Fig. 6. In this view, lock bolt arrangement is emphasized.
Figure 13 is a fragmentary view taken along line 13—13 of Fig. 12.
Figure 14 is an enlarged detailed view of lock bolt catch.
Figure 15 is a wiring arrangement of electrical elements.
Figure 16 is a sectional view taken along line 16—16 of Fig. 15. In this view is shown the cover assembled.
Figure 17 is an enlarged fragmentary section taken along line 17—17 of Fig. 9.

In Fig. 17 is shown one end of shaft 33 supported by a ball bearing 121. Said ball bearing 121 is secured in a floating member 37. Said member 37, which is a flanged ring with a lower and an upper threaded lug arranged for positive movements in a vertical path. At 37a is shown a protruded portion of 37. Said portion floats or moves in a clearance hole or slot 124. Retaining member 36 shown in Figs. 9 and 17, is a frame having an upper and lower lug with clearance holes for adjusting screw rod shoulders 34b and 34c. Said member 36 is fastened to plates 12R and 12L by the use of a number of screws 106 as shown in Fig. 9. In Fig. 17 numeral 35 indicates washers. Element 39 is a collar, into which shoulder 34b enters and is then riveted. The body of element 34 is threaded as at 34a. It can evidently be seen, that by turning knurled head of screw rod 34, the threaded body 34a will cause movable member 37 to move in a vertical path, in a direction corresponding to turn of screw rod 34. On the end of shaft 33 opposite to that shown in Fig. 17, a duplicate of the above adjusting arrangement is used. It should be obvious that the adjusting arrangement just described is positive in action. It might be well to mention that when the adjusting screw 34 as shown in Fig. 17 is manipulated on both ends of shaft 33 all elements fastened thereto move as a unit. The function of said adjusting scheme is to regulate the tension on a set of roller chains.

Figure 6:
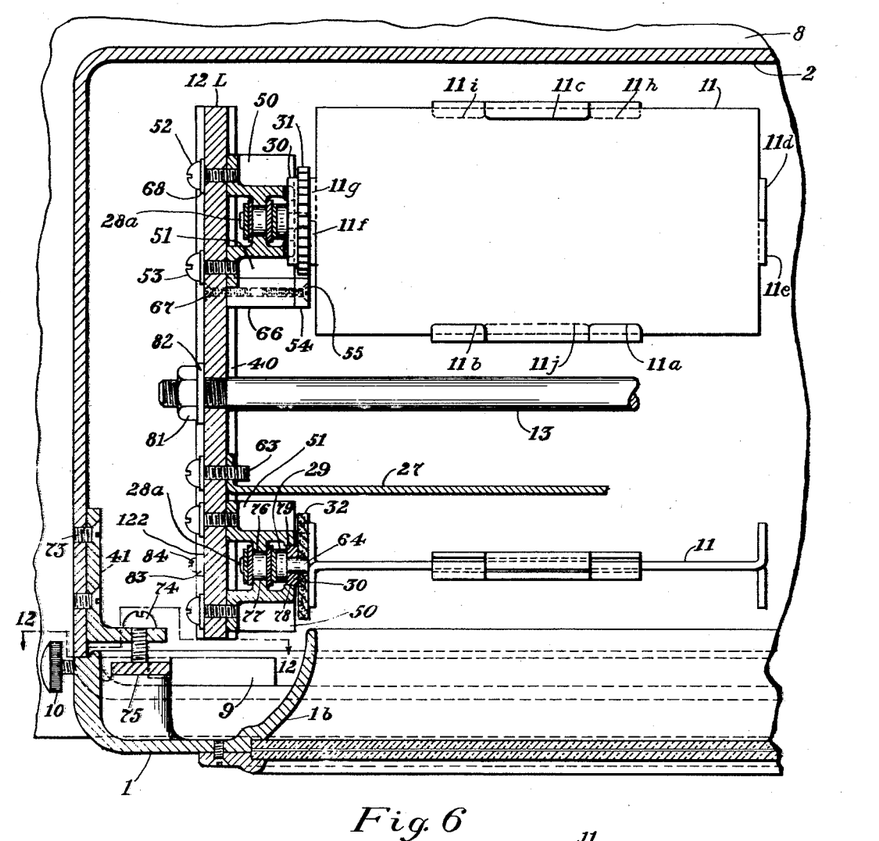
Figure 6 is an enlarged fragmentary section taken along line 6—6 of Fig. 4.
Figure 8:
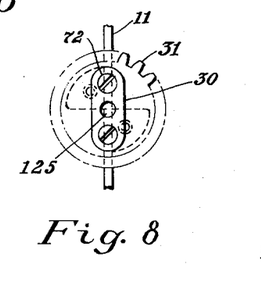
Figure 8 is an enlarged fragmentary view of a card retainer fastened to one side of a gear with guide plate shown in full line fastened to the opposite side of said gear.

In Fig. 3 is shown a set of roller chains 28 and 28a which bear on respective sprocket gears 23. The said roller chains 28 and 28a, have a plurality of shouldered studs, equally spaced and arranged in horizontal alignment. In Fig. 6 is shown more clearly the studs 64 and shoulders 29. In this particular instance the roller chains 28 and 28a, have twelve shouldered studs each, equally spaced. A plurality of duplex card retaining plates 11 is shown in Fig. 3. Said plates are carried on the shouldered studs of roller chains 28 and 28a. Said studs fit into corresponding holes 125 in guide plate 30 as shown in Fig. 8. The duplex card retaining plates 11 revolve on studs 64 when the proper location in a cycle of movement is reached. During the remainder of a cycle of movement the duplex card retaining plates 11 are prevented from revolving by guide plate 30, shown in Fig. 8, which slides between two tracks 50 and 51 shown clearly in Fig. 6. As the guide plates 30 leave the tracks 50 and 51 they ride on a disc 25 and are thus held in controlled position. In Fig. 17 is shown a detail of disc 25 which is spaced by collars 24 and fastened to gear 23.

Figure 7:
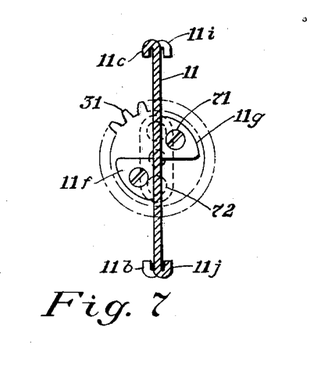
Figure 7 is an enlarged sectional view of card retainer, fastened to one side of a gear.

In Figs. 7 and 8 are shown enlarged details of duplex card retaining plates 11. Fig. 7 shows a section through the body of one of said plates 11. Numerals 11f and 11g show ears of element 11 fastened to gear 31 by the use of screws 71. In Fig. 8 is shown guide plate 30 fastened to the opposite side of gear 31 by the use of screws 72. In Fig. 3 is shown that each of the duplex card retaining plates 11, has a gear 31 on one end only. The said gears 31 are alternately located. On the end of the elements 11 opposite to that on which gear 31 is located is a disc 32 of the same thickness as element 31 and of a diameter equal to or less than the root diameter of said gear 31. In Fig. 6 is shown an enlarged detail of elements 31 and 32. It is possible that conditions may arise that would make it desirable or necessary to substitute two gears 31 instead of one gear 31 and one disc 32, this of course would not necessitate any change in the arrangement of herein described mechanism.

In Fig. 6, duplex card retaining plates 11 are shown with formed clips 11a; 11b; 11c; 11j; 11h and 11i. As shown in full lines, clips 11a; 11b and 11c will clamp a card on the side or face shown while clips 11j; 11i and 11h will clamp a card on the side or face, reverse to that shown, in full lines. In Fig. 6 at 50 and 51 is shown in large detail, tracks for guiding roller chains 28 and 28a and guide plates 30. Elements 50 and 51 are fastened to side plates 12R and 12L by the use of screws 53. Numeral 68 indicates lock washers. At 76 and 77 is shown tracks in contact with the rollers of sprocket chains 28 or 28a. At 78 and 79 is shown tracks between which guide plates 30 slide and thus keep the duplex card retaining plates 11, which are attached thereto, in controlled position. In Fig. 6, numeral 66 is a bar upon which gear rack 54 is fastened. In turn, a said bar 66 is fastened to side plates 12R and 12L. Screws 55 and 67 are used to secure said elements in place.

Figures 4, 5:
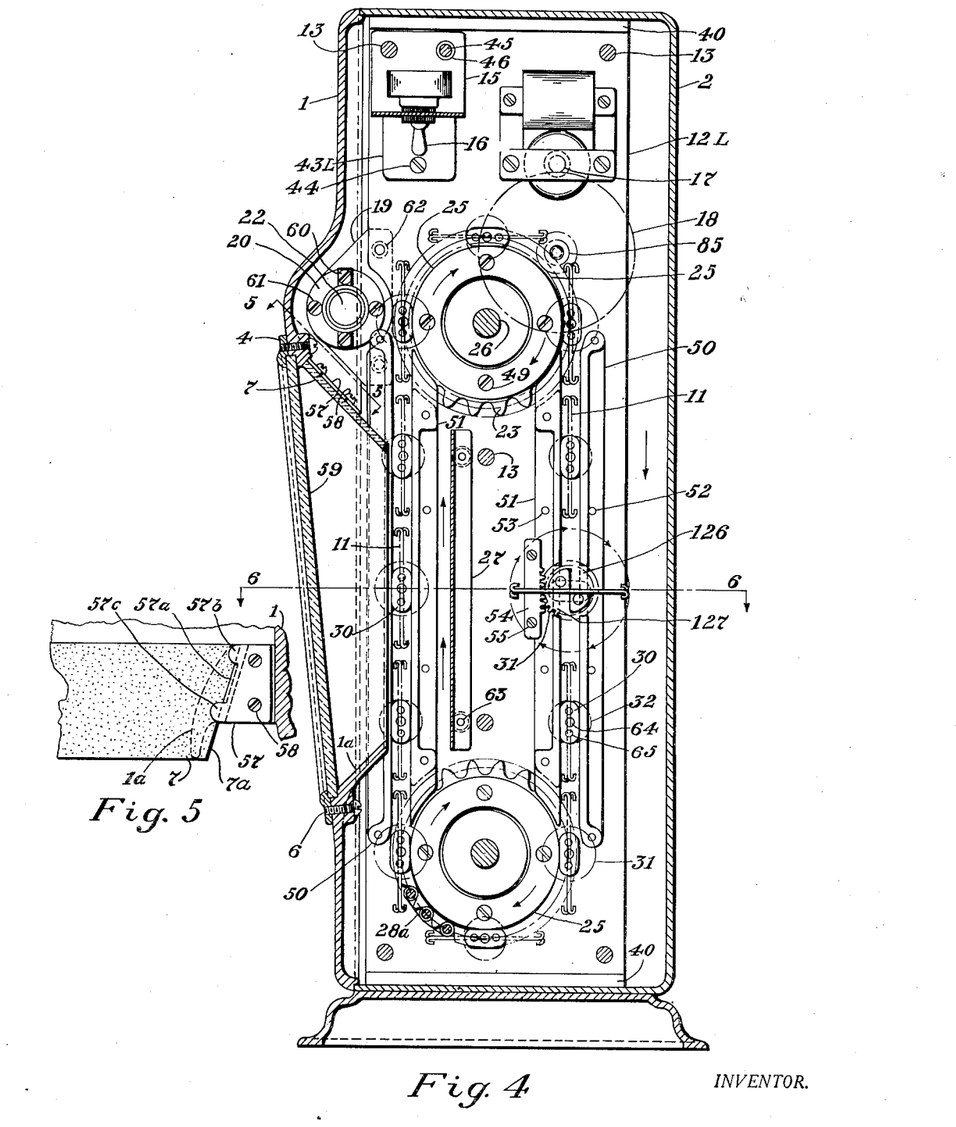
Figure 4 is a sectional view taken along line 4—4 of Fig. 3. In this view is shown guide plates in full and such elements as gears; card retainers, etc., in dot and dash lines for the purpose of clearness, in emphasizing items of importance.
Figure 5 is a fragmentary view of light diffusing vitreous plate, taken at line 5—5 of Fig. 4.

In Fig. 4 is shown a series of duplex card retaining plates in dot and dash lines. Shown in full lines are the guide plates 30, which are thus shown for clearness. Only a fragment of the roller chain 28a is shown so as to avoid possible confusion of lines. Note that the guide plates 30 are guided between track elements 50 and 51 while in vertical position. When the guide plates 30 leave the tracks 50 and 51, one of its sides rests on the face of a disc 25. Said elements 30 are held securely against the face of disc 25 by roller chain 28 or 28a. The guide plates 30 travel in a direction indicated by arrows on discs 25. When elements 30 reach the cut out sections of tracks 50 and 51, shown by numerals 126 and 127 Fig. 4, the guide plates 30 are then in a position to rotate. As guide plates 30 are fixed to duplex card retaining plates 11 it is obvious that movements of plates 30 govern the movements of plates 11. At this stage, gear 31, which is attached to guide plate 30, meshes with a corresponding gear rack 54 and as gear 31 is caused to travel downward, said gear rack 54 imparts a rolling motion to said gear 31. Gear rack 54 is provided with a sufficient number of teeth to cause the gear element 31 to rotate a movement of one-half a revolution. As the gear 31 completes its rotational movement, it again enters the guide tracks 50 and 51 and continues in motion, with controlled position, for the remainder of a cycle of movement.

Figure 10:
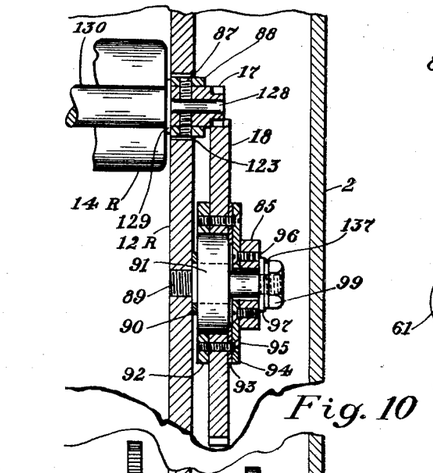
Figure 10 is an enlarged fragmentary section taken along line 10—10 of Fig. 9.

In Fig. 3 is shown two synchronous motors, designated by numerals 14L and 14R. On the end of each of said motor shafts is mounted a pinion 17. In Fig. 10, in large detail is shown pinion 17. A collar 88 is shown which slips over said pinion 17. Owing to the fact that pinion 17 is small in size, there is not sufficient material in which to produce threads for set screws, therefore the collar 88 furnishes material in which an ample number of threads can be produced. Two set screws 87 are used to fasten pinion 17 to motor shaft 128. The collar 88 passes through an aperture 123 in side plate 12R or 12L. In Fig. 9 is shown a gear train. Pinion 17 which is driven by one of the motors 14L and 14R, drives gear 18. In turn gear 18 which has a pinion 85 attached thereto imparts motion to pinion 85 which meshes with gear 86 and consequently drives same. Gear 86 is fastened to shaft 26. A duplicate of said gear train is used on the end of shaft 26 opposite to that shown in Fig. 10. Each of the two gear trains has an independent motor for its driving force. The motors being of synchronous type, can be relied upon to produce a harmonious drive provided all adjustments are correct. When all adjustments are properly made satisfactory operation is assured. Shaft 26 which is directly driven by the gear mechanism described, imparts corresponding motion to shaft 33 shown in Fig. 17, by means of roller chains 28 and 28a, which mesh with sprocket gears 23. The motors 14L and 14R are fastened to side plates 12R and 12L by means of screws 80 passing through said plates 12R and 12L and entering motor studs 130 as shown in Figs. 9 and 10. Numeral 129 indicates a yoke that ties motor studs 130.

In Fig. 4 is shown a detailed sectional view of the inwardly converging aperture in door. At 59 is shown a transparent vitreous plate, which protects duplex card retaining plates 11 with advertising cards from atmospheric exposure. In back of duplex card retaining plates 11 at the inwardly converging aperture in door is shown a screen 27. Said screen acts as a background to advertising matter and prevents shadows and exposure of mechanical elements to view. In Fig. 6 is shown screen 27 fastened to side plate 12L by screws 63. Same is similarly fastened to side 12R.

Fig. 5 shows in detail the method of fastening treated vitreous plate 7 in place. Numeral 57 is a clip which has a certain amount of flexibility. The clip 57 is fastened to a lug formed on door 1 by means of screws 58. Treated vitreous plate 7 rests on the top edges of the sides of inwardly converging aperature of door 1. The end edges of plate 7 are cut at an angle as shown at 7a. The lip 57a is bent downward and rests against the edge of plate 7 at 7a. The lips 57b and 57c rest on top of plate 7. The angled edges as at 7a, form a wedge against lip 57a, consequently plate 7 is held secure and prevented from sliding downward. The flexibility of clip 57, eliminates the danger of breaking plate 7 when fastening in place. Plate 7 is treated so as to diffuse and direct a volume of illuminating rays.

In Fig. 3 numeral 19 is a plate spaced by collars 21 and fastened to sides 12R and 12L by means of screws 62 shown in Fig. 9, also Fig. 4. In Fig. 3 attached to plates 19 is shown incandescent lamp sockets 20 which are fastened by means of screws 61 as shown in Figs. 4 and 9. In Fig. 3 is shown incandescent elements 22 mounted in sockets 20. In Fig. 4 is shown incandescent elements 22, mounted above plate 7. Said elements 22 serve as a means of illumination. In Fig. 3 is shown an electric switch 16 mounted on bracket 15. This switch is used for switching motor power on and off when changing advertising cards. In Fig. 4 bracket 15 is shown supported by a spacing rod 13 and an additional rod 45. Rod 45 is threaded and a spacing collar 46 which is also threaded, travels on same. Said collar 46 fits between two sides of bracket 15. Bracket 15 has two clearance holes in each of its sides which fit over rods 13 and 45. By moving collar 46, the bracket 15 will move and remain in secured position.

In Fig. 4 numeral 43L is an electric connector block which is shown in detail in Figs. 15 and 16. One block each is used for one motor and one incandescent element. Said blocks 43R and 43L are fastened to side plates 12R and 12L correspondingly, by means of screws 44 which pass through apertures 109 as in Figs. 15 and 16. In Fig. 3 a view of blocks 43L and 43R is omitted, so that motors 14L and 14R could be shown more clearly.

Fig. 10 shows a detailed mounting of gear 18 and 85. A stud 89 is fastened to the side of plate 12R and 12L. A ball bearing 91 rests on the shoulder of stud 89 and is spaced from side plate 12R or 12L by spacing washer 90. Ring 92 is fastened to gear 18 by screws 95 which pass through plates 93 and 94 and retains the several elements in assembled position. Pinion 85 is fastened to plate 94 by screws 96. A plain washer 97 and a lock washer 137 is slipped over stud 89 and a threaded nut 99 is used to complete the assembly.

Fig. 12 shows lock bolt 75 in detail. The bolt 75 has three slots 117; 117a and 117b. The bolt slides on bosses 1a; 1b and 1c as in Fig. 13. Said bosses are formed integral with door 1. Screws 116a; 116b and 116c are used to secure said bolt 75 in position. The plate 114 is fastened to lock bolt 75 by means of screws 115, Fig. 13. Control button 10 Fig. 12, passes through a slot 1d in door and fastens into block 114 and bolt 75 which form a unit as at 10 Fig. 13. Bolt 75, Fig. 13 shows a catch screw 74 fastened thereto. Said screw 74 can be adjusted and secured in place by nut 113. Numeral 112 is a lockwasher. The body of screw 74, when moved upward, enters a cutout 42, shown clearly in Fig. 14. The head of screw 74, rests against surface 41a of Fig. 13 and thereby prevents door from being opened. Catch 41, Fig. 14 is fastened to body 2 by means of screws 73 passing through apertures 38 and fastening into body 2 as shown in Fig. 6. Fig. 12 numeral 9 is a commercial lock. Said lock is fastened to door 1 by means of screws 131. Fig. 12 shows lock bolt 75 in locked position. Lock plunger 118 enters cutout 119 and prevents lock bolt from being moved. By inserting key in keyhole 9a and properly turning, the lock plunger 118 reverses its movement, then by moving control button 10 downward, screw 74 as in Fig. 13, moves from catch 41 and the door 1 can then be opened. To lock same the reverse operation is essential.

Fig. 16 shows a sectional view of electrical connector block 43R or 43L. Numerals 43R and 43L indicates the body in general. Cover is designated by numeral 107. Elements 43 and 107 are of course made of electrical insulating materials. Plates 111 are electrical conducting elements. Screws 110 are used to fasten wire terminals and conducting plates 111 to blocks 43R and 43L. Holes in blocks 43R and 43L are threaded to receive screws 110. Blocks 43R and 43L are fastened to side plates 12R and 12L by means of screws passing through holes 109. Screws 108, Fig. 16, fasten the cover 107 in place by entering tapped holes 132, Fig. 15.

In Fig. 15 numerals 133 and 134 are the main electrical supply circuits. Circuit 135 supplies positive current to respective connectors in blocks 43R and 43L. Circuit 136 supplies a negative path for current in said blocks. Incandescent elements 22 complete a circuit at 22P and 22N. Motor element 14L completes a circuit at 14P and 14N. Connections and arrangements for blocks 43R and 43L are duplicates. Switch 16 is used to open and close the electrical circuits when changing advertising cards. Same controls the operation of the mechanism. Detailed explanations of the use of switch 16 was given earlier in this specification. The use of switch 16 eliminates the necessity of operating the machine manually when changing advertising cards.

The machine built in accordance with the drawings and specifications just rendered can be operated at an extremely low power cost. It can be run continuously without overheating and its operation is practically noiseless and a minimum of care is required to continue in its service.

Having thus described my invention, I claim as new and desire to secure by Letters Patent, the following:—

1. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, a screen arranged at the converging aperture of door and in back of exposed duplex card retaining plates, which conceals mechanism and produces a background for advertising cards, means for causing duplex card retaining plates to circulate.

2. An advertising apparatus of the character described, comprising a cabinet with a door having an inwardly converging aperture, faced with a transparent panel, and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, means for controlling the position of said duplex card retaining plates, a screen arranged at the converging aperture of door and in back of exposed duplex card retaining plates, which conceals mechanism and produces a background for advertising cards, means for causing duplex card retaining plates to circulate.

3. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, mechanical means for causing duplex card retaining plates to rotate one-half of a revolution, for each cycle of operation of a series of duplex card retaining plates, thus causing advertising cards, attached to said duplex card retaining plates, to alternate in appearing at the inwardly converged aperture in door, a screen arranged at the converging aperture of door and in back of exposed duplex card retaining plates, which conceals mechanism and produces a background for advertising cards, means for causing duplex card retaining plates to circulate.

4. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, means for maintaining said duplex card retaining plates in movable, rotationally, spaced relation, a screen arranged at the converging aperture of door and in back of exposed duplex card retaining plates, which conceals mechanism and produces a background for advertising cards, means for causing duplex card retaining plates to circulate.

5. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, means formed integral with said duplex card retaining plates, to secure same to a gear and a guide plate on one end and a disc and a guide plate on the opposite end, a screen arranged at the converging aperture of door and in back of exposed duplex card retaining plates, which conceals mechanism and produces a background for advertising cards, means for causing duplex card retaining plates to circulate.

6. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, means formed integral with said duplex card retaining plates, to secure same to a gear and a guide plate on each end, a screen arranged at the converging aperture of door and in back of exposed duplex card retaining plates, which conceals mechanism and produces a background for advertising cards, means for causing duplex card retaining plates to circulate.

7. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, means formed integral with said duplex card retaining plates, to secure same to a disc and a guide plate on each end, a screen arranged at the converging aperture of door and in back of exposed duplex card retaining plates, which conceals mechanism and produces a background for advertising cards, means for causing duplex card retaining plates to circulate.

8. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, means formed integral with said duplex card retaining plates, to secure cards in fixed position to each side of same, a screen arranged at the converging aperture of door and in back of exposed duplex card retaining plates, which conceals mechanism and produces a background for advertising cards, means for causing duplex card retaining plates to circulate.

9. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, means, in the use of rectangular plates guided between tracks, for accomplishing control of position of said duplex card retaining plates, a screen arranged at the converging aperture of door and in back of exposed duplex card retaining plates, which conceals mechanism and produces a background for advertising cards, means for causing duplex card retaining plates to circulate.

10. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, means, in the use of discs attached to gears, for accomplishing control of position of said duplex card retaining plates, while in a rotating path, a screen arranged at the converging aperture of door and in back of exposed duplex card retaining plates, which conceals mechanism and produces a background for advertising cards, means for causing duplex card retaining plates to circulate.

11. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, means, in the use of a set of tracks, guiding and maintaining in controlled position, a series of roller chain links, a screen arranged at the converging aperture of door and in back of exposed duplex card retaining plates, which conceals mechanism and produces a background for advertising cards, means for causing duplex card retaining plates to circulate.

12. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, a screen arranged at the converging aperture of door and in back of exposed duplex card retaining plates, which conceals mechanism and produces a background for advertising cards, means for causing duplex card retaining plates to circulate, mechanical arrangement in conjunction with a key manipulating lock, for securing cabinet door and body in locked position.

13. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, structural arrangement, for supporting incandescent elements, whereby ready access to and quick replacement of said incandescent elements can be accomplished, a plurality of duplex card retaining plates, in spaced relation and controlled positon, a screen arranged at the converging aperture of door and in back of exposed duplex card retaining plates, which conceals mechanism and produces a background for advertising cards, means for causing duplex card retaining plates to circulate.

14. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, a screen arranged at the converging aperture of door and in back of exposed duplex card retaining plates, which conceals mechanism and produces a background for advertising cards, means for causing duplex card retaining plates to circulate, mechanical means for effecting positive tensional adjustment of roller chains bearing on a set of upper and lower sprocket gears.

15. An advertising appartus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, a screen arranged at the converging aperture of door and in back of exposed duplex card retaining plates, which conceals mechanism and produces a background for advertising cards, means for causing duplex card retaining plates to circulate, mechanical and structural means and arrangements, for effecting smooth and quiet operation of propelling mechanism with a small consumption of power.

16. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, a screen arranged at the converging aperture of door and in back of exposed duplex card retaining plates, which conceals mechanism and produces a background for advertising cards, arranged mechanical and electrical means for causing duplex card retaining plates to circulate.

17. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, a screen arranged at the converging aperture of door and in back of exposed duplex card retaining plates, which conceals mechanism and produces a background for advertising cards, means for causing duplex card retaining plates to circulate, arrangement of electrical connection blocks, in compact form, enabling ease and accuracy in assembling and quick detection and correction of electrical defects or failure.

18. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, a screen arranged at the converging aperture of door and in back of exposed duplex card retaining plates, which conceals mechanism and produces a background for advertising cards, means for causing duplex card retaining plates to circulate, arrangement of various electrical, mechanical and structural elements, constituting the mechanism, so that same can be removed from cabinet, as a completely assembled unit, thus enabling quick repair or replacement of same.

19. An advertising apparatus of the character described, comprising a cabinet with a door having an inwardly converging aperture, faced with a transparent panel and capped in the upper end with a treated vitreous wall, serving as a means of diffusing and directing a volume of illuminating rays, a pocket of convexed contour, formed integral with door, for housing incandescent elements, a plurality of duplex card retaining plates, in spaced relation and controlled position, a screen arranged at the converging aperture of door and in back of exposed duplex card retaining plates, which conceals mechanism and produces a background for advertising cards, means for causing duplex card retaining plates to circulate, arrangement of the various electrical, mechanical and structural elements, constituting the mechanism, so that any part of same can be removed from the unit assembly, quickly and easily, thus enabling quick repair or replacement of any of the various component parts of same.

THOMAS A. JENKINS.